United States Patent [19]

Hewitt et al.

[11] Patent Number: 4,548,330

[45] Date of Patent: Oct. 22, 1985

[54] TAMPER RESISTANT CONTAINER

[75] Inventors: Donald J. Hewitt; Juan O. Becera, both of San Diego, Calif.

[73] Assignee: Hewitt Tubular Products, Inc., San Diego, Calif.

[21] Appl. No.: 553,834

[22] Filed: Nov. 21, 1983

[51] Int. Cl.⁴ .................... B65D 55/14; B65D 43/16; B65D 43/20

[52] U.S. Cl. ...................... 220/210; 70/160; 109/70; 220/331

[58] Field of Search ............... 220/210, 331; 312/215, 312/217, 222, 223, 245; 49/254, 255; 109/64, 73, 70; 70/159, 160; 16/248

[56] References Cited

U.S. PATENT DOCUMENTS

| | | | |
|---|---|---|---|
| 1,436,951 | 11/1922 | DeWaters | 49/254 |
| 1,510,893 | 10/1924 | Long | 109/64 |
| 1,873,367 | 8/1932 | Ferris | 16/233 |
| 2,086,534 | 7/1937 | Byrne | 220/331 |
| 2,569,254 | 9/1951 | Page | 220/331 X |
| 3,165,225 | 1/1965 | Reitzel | 220/331 X |
| 3,734,335 | 5/1973 | Lincoln | 220/210 X |
| 4,048,050 | 9/1977 | Hillman | 220/331 X |

FOREIGN PATENT DOCUMENTS

| | | | |
|---|---|---|---|
| 116711 | 10/1929 | Austria | 220/331 |
| 389175 | 3/1933 | United Kingdom | 16/248 |

Primary Examiner—Allan N. Shoap
Attorney, Agent, or Firm—Tom Sherrard; William F. Frank

[57] ABSTRACT

A container for TV cables and terminals with mating edges between the stationary body part and its hinged door to reduce the opportunity for forced illegal entry by apartment and condominium dwellers.

4 Claims, 13 Drawing Figures

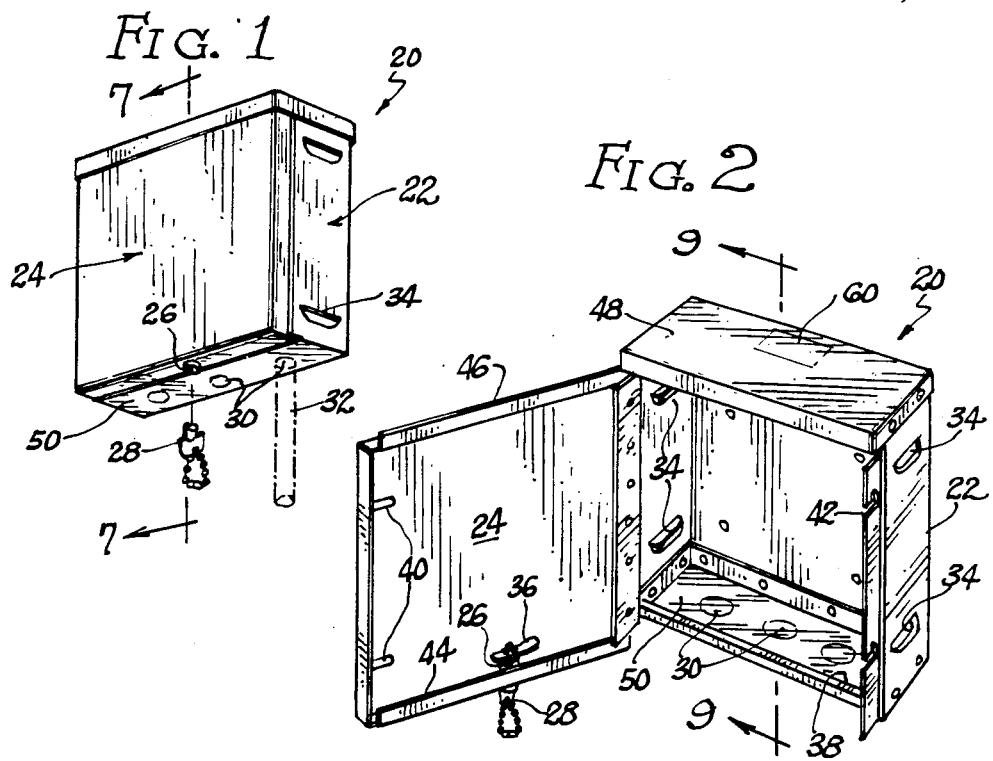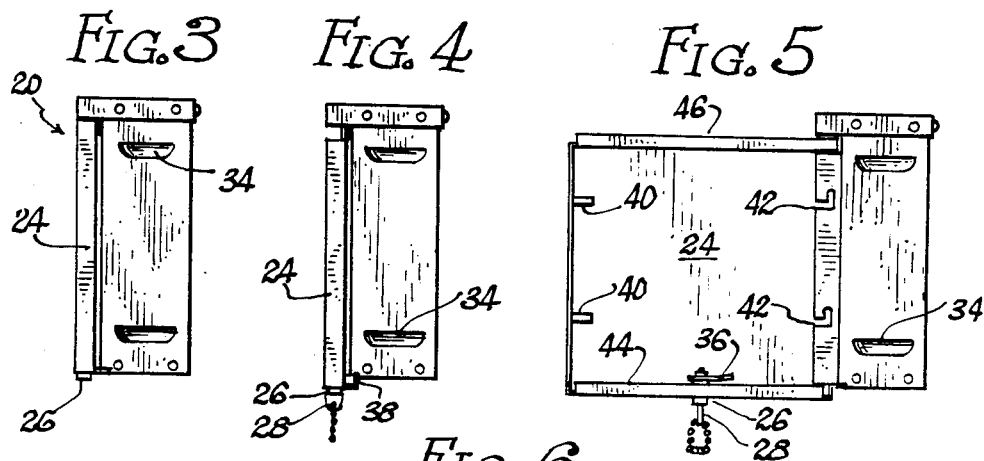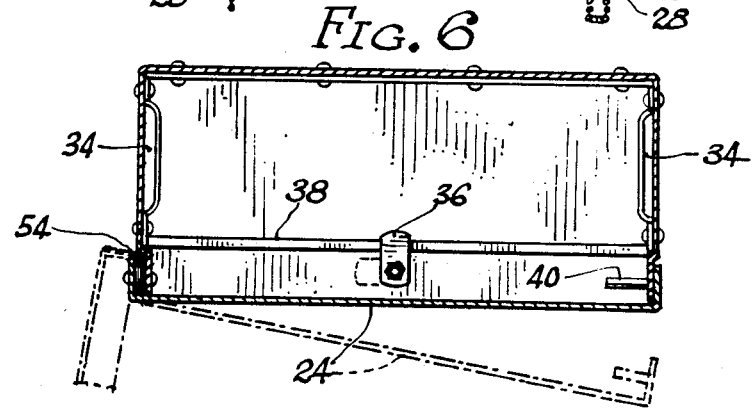

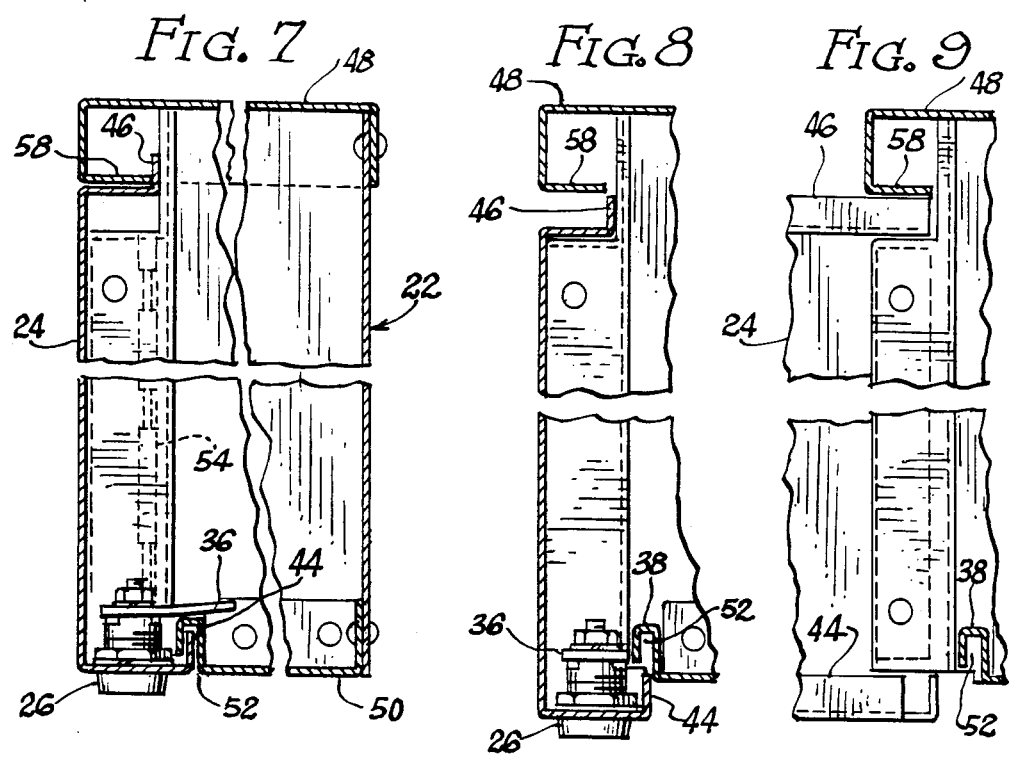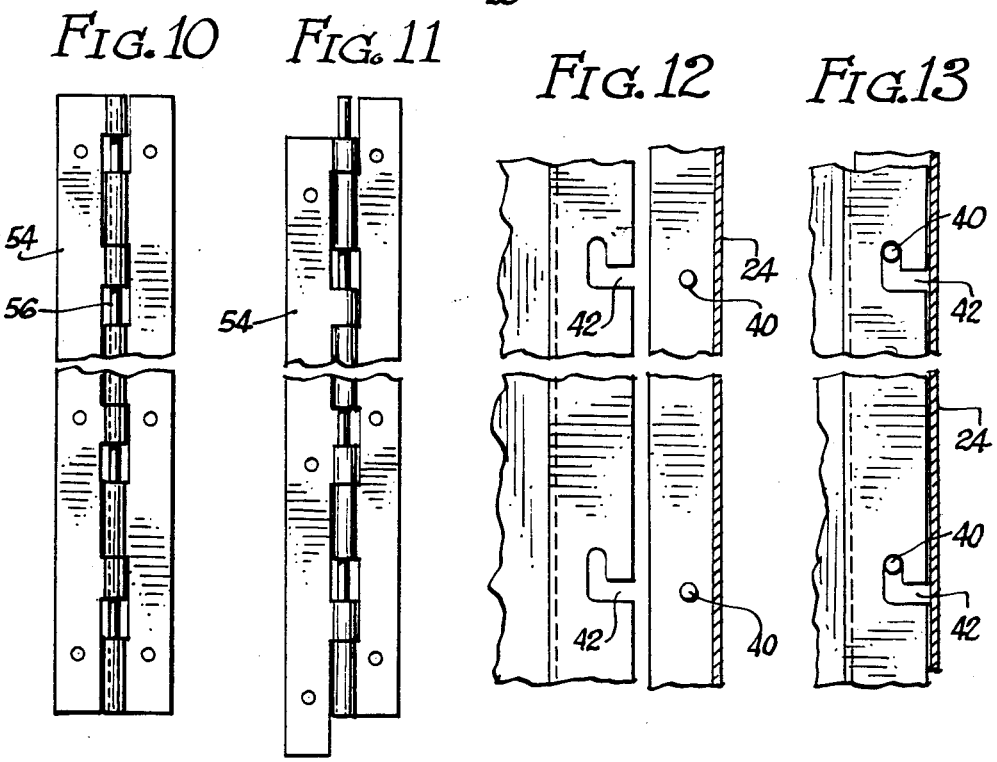

TAMPER RESISTANT CONTAINER

BACKGROUND OF THE INVENTION

Unlawful entry into containers is a serious problem. This is true of containers secured to buildings containing wire or cable connections for electrical or conmunication systems. Although not limited thereto, the subject invention is especially useful as a housing for TV cable equipment at the juncture of wires leading to individual living units and the master cable coming to the building. Breaking and entering into conventional boxes is not uncommon. Thieves do this to tap onto the master cable to avoid paying the usual service charges for TV service. Conventional boxes are relatively easy to break into. This is now corrected by the subject invention.

SUMMARY OF THE INVENTION

The subject invention is a container which is economical to make; easy to install and operate and which provides adequate resistance to criminals who might attempt to pry open the door of the unit.

The invention features a hinged door which is pushed upward and secured by the cam action of its lock when in the closed position. Such action brings flanges along the top and bottom edges of the door within matching grooves of the body of the container. Also the locking operation brings projections on one side of the door into matching recesses along one side of the container. Having a novel hinge on the remaining edge of juncture, the closed container is sealed. It avoids components that could serve as a bearing surface for tools used in prying.

BRIEF DESCRIPTION OF THE DRAWINGS

In the accompanying drawings:

FIG. 1 is a perspective view of the invention with the door closed.

FIG. 2 is perspective view thereof with the door open.

FIG. 3 is a side elevation view thereof with door raised.

FIG. 4 is a side elevation view with the door in the lowered position for opening.

FIG. 5 is the same side view except the door is open.

FIG. 6 is a bottom plan view from the inside of the container.

FIG. 7 is a vertical section thereof taken along line 7—7 of FIG. 1 showing door in a locked position.

FIG. 8 is same as left section of FIG. 7 except door is in an unlocked position.

FIG. 9 is same section as that of FIG. 8 except door is in open positon. It is taken along line 9—9 of FIG. 2

FIG. 10 is a detail of the novel hinge as when the door is locked.

FIG. 11 is same as FIG. 10 except the door is unlocked.

FIG. 12 is a detail showing the alignment of projections and recesses before engagement.

FIG. 13 is a detail showing engagement of projections and recesses.

DESCRIPTION OF PREFERRED EMBODIMENT

Again referring to the drawing, wherein like numerals represent like parts throughout, the numeral 20 points to the entire unit. It is preferably made of 16 gauge galvanized sheet steel. Parts are riveted or spot welded together. Item 22 is the body portion. It is of rectangular shell configuration as illustrated. It has conventional "knock-outs" 30 in its bottom panel 50. This is for entry of conduits or cable 32 when used as a junction box. Vent louvers 34 may be provided on the side panels as shown. The top panel 48 may have conventional "knock-out" 60 to create orificies for wires.

Novel features reside in the outer edge of the top, bottom and one side of the body portion. Such edges are provided with recessed members suitable for accepting mating portions on the door. This is to thwart attempts to wedge a tool between the body portion and the abutting door.

Thus integral with, and as an extension of side 22, we have provided a flange with a plurality (preferably two) of L-shaped recesses 42. The end of the horizontal leg of each recess is open and the other leg extends vertically upward.

Attention is next invited to the bottom recessed member. It is preferably an inverted channel member 52 integral with and extended along the entire exposed edge.

Oppositely disposed to the bottom is top recessed member 58. It too is of U-shape channel configuration. One leg thereof is an extension of the outer edge of the top panel. It is beyond the lateral distance of the bottom extension whereby the transverse section of the portion is flush with the face of the door when the door is closed.

Turning now to the novel door, it features projections to snugly fit within the space of the body portion recesses. Thus projections 40 are mounted by their bases to an inwardly turned edge-section (unnumbered) along one side of door 24. They are essentially bosses or pins and are the same in number as recesses 42 in which they fit.

Next in order is bottom flange portion 44. It is formed as the up-turned outer edge of the horizontal bottom section (unnumbered) of the door panel.

Next, is top flange 46. It too is formed as the up-turned outer edge of the horizontal top section (unnumbered) of the door panel. As can be seen, the top horizontal section is more narrow than the parallel bottom horizontal section. This difference accommodates the difference in horizontal extension of the corresponding recessed portions with which the flanges mate.

For locking the door into engagement with the body portion, is securing means 26. Preferably, this securing means is a key 28 operated conventional lock mounted in the horizontal bottom section of the door midway along its length. The key rotates a shaft within the lock to which is affixed, at its opposite end, a bar or arm 36. FIGS. 7 through 9 of the drawings best show the engaging parts of the door, body, the lock and their alignments.

As a final novel contribution, the assembly has a novel hinge between the door and body. It is mounted along the side opposite that of the described projection and L-shape recess arrangement. Preferably it is a modified piano hinge. The common double-leaf 54 with pintle 56 features are retained. Unique space means is added between the leaves where they come together at the pintle. This space is substantially equal, in vertical dimension, to the distance the described projections move into the described recesses. This permits desired vertical movement of the door.

In use, the box is mounted on a building wall by screws or bolts through its back wall and with the projections, recesses and hinge spaces as illustrated. An incoming cable is permanently maintained through a fixed orifice. Outgoing multiple cables separately extend through orifices with suitable connections between the incoming and outgoing cables being provided within the container. To add or remove a cable the operator merely rotates the lock arm with a key. The arm slides off the horizontal surface of the bottom recess member and the entire door automatically drops due to the force of gravity. It drops far enough for the mating parts to clear each other and it stops because one hinge leaf again rests on the other leaf at the hinge pintle. Now the door may be swung open. To close and lock the door the process is reversed. The door is swung shut, then manually raised. Space is closed on one side of the hinge's leaves and equal space is opened on the lower other side. Projections and flanges fit into aligned recesses, the key is again turned and the arm resting on the bottom recess surface holds the door up in a sealed, tamper resistant position.

Skilled persons may make obvious changes without departing from the scope of the subjoined claims.

We claim:

1. In combination, a tamper resistant container comprising a body portion having a top wall, a bottom wall, a rear wall, two opposed side walls and a front opening providing entry into the container, the container having recessed portions on the top and bottom walls defined by extensions of side walls bent to form said recessed portions adjacent said front opening; a door having opposed flanged sides and top and bottom flanges, said flanges extending in the same direction vertically and engaging said recessed portions when said door is locked closed over said front; a hinge operatively connecting one side wall of said body portion and one side of the door extending between said flanges, said hinge comprising a pintle with intermeshing leaves, said leaves being provided with gaps therebetween for relative movement whereby the door may move vertically along said pintle; and locking means for holding the door in a raised position vertically with the door flanges fitted within the corresponding recessed portions of the body portion when the door is moved vertically upward along said pintle.

2. The container according to claim 1 wherein body portion has a plurality of L-shaped recesses on the side wall opposite that of the hinge and the door has a plurality of inwardly extending projections mounted on the flanged side opposite that of the hinge suitable for fitting into the legs of the L-shaped recesses when said door is raised.

3. The container according to claim 1 wherein said locking means further comprises key-operated camming means pivotally mounted in said door bottom flange operatively engaging the upper side of one of said recessed portions on said body portion.

4. A tamper resistant container of rigid material comprising a body portion and a door portion; said body portion comprising a back panel, top and bottom panels and side panels therebetween, said top panel extending beyond said bottom panel a distance substantially equal to the depth of said door portion and terminating in an inwardly facing U-shaped channel, said bottom panel terminating in a downwardly facing U-shaped channel, each side panel terminating in an inwardly offset flat flange along its length, the flange on one of said side panels having two vertically extending L-shaped recesses on its outer edge, the flange of the other said panel having one leaf set of a double-leaf-and-pintle hinge secured to the outer surface thereof; said door portion comprising a back panel, top and bottom panels and side panels therebetween, the top panel terminating in an upwardly extending outer edge to be fitted behind the inwardly facing U-shaped channel on said body top panel, said door bottom panel having a depth greater than said door top panel and terminating in an upwardly extending outer edge to be fitted into said downwardly facing U-shaped channel on said body bottom panel, one of said door side panels carrying inwardly projecting pins to engage said L-shaped recesses, the other of said door side panels having the correspondinag mating leaf set of said hinge secured to its inner surface, the door being capable of upward and downward movement relative to the body portion along the pintle securing the leaf sets together, the door portion further having mounted in the bottom panel a key operated securing means having a camming bar on its inner end which can engage the upper surface of said downwardly facing U-shaped channel on said body bottom panel to hold said door upwardly with the upwardly extending outer edges of the door being received in the respective U-shaped channels on said body portion and with said projecting pins being received into said L-shaped recesses in said body side panel.

* * * * *